United States Patent
Jeong et al.

(10) Patent No.: US 10,351,433 B2
(45) Date of Patent: Jul. 16, 2019

(54) GRAPHENE OXIDE REDUCED MATERIAL DISPERSED AT HIGH CONCENTRATION BY CATION-Π INTERACTION AND METHOD FOR MANUFACTURING SAME

(75) Inventors: Seung-yol Jeong, Changwon-si (KR); Geon-woong Lee, Changwon-si (KR); Joong-tark Han, Changwon-si (KR); Hee-jin Jeong, Changwon-si (KR); Sung-hun Kim, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 686 days.

(21) Appl. No.: 14/361,784

(22) PCT Filed: Feb. 13, 2012

(86) PCT No.: PCT/KR2012/001042
§ 371 (c)(1),
(2), (4) Date: Jul. 18, 2014

(87) PCT Pub. No.: WO2013/081248
PCT Pub. Date: Jun. 6, 2013

(65) Prior Publication Data
US 2014/0323596 A1    Oct. 30, 2014

(30) Foreign Application Priority Data
Nov. 30, 2011 (KR) .................. 10-2011-0126843

(51) Int. Cl.
*C01B 32/198* (2017.01)
*C01B 32/23* (2017.01)
(Continued)

(52) U.S. Cl.
CPC ............ *C01B 32/23* (2017.08); *B01J 20/205* (2013.01); *B82Y 30/00* (2013.01); *B82Y 40/00* (2013.01);
(Continued)

(58) Field of Classification Search
CPC . C01B 31/043; C01B 31/0438; C01B 32/194; C01B 32/23; C01B 32/182; C01B 32/198; C08K 3/042; B01J 20/205
See application file for complete search history.

(56) References Cited

U.S. PATENT DOCUMENTS

| | | | |
|---|---|---|---|
| 9,318,231 B2 * | 4/2016 | Ku .................. | B82Y 30/00 |
| 2010/0237296 A1 * | 9/2010 | Gilje .................. | B82Y 30/00 |
| | | | 252/510 |

(Continued)

OTHER PUBLICATIONS

Hummers et al., Preparation of Graphitic Oxide, J. Am. Chem. Soc., Mar. 1958, 80 (6), pp. 1339-1339.*
(Continued)

*Primary Examiner* — Michael A Salvitti
(74) *Attorney, Agent, or Firm* — Park & Associate IP Law, P.C.

(57) ABSTRACT

The present invention relates to a graphene oxide reduced material dispersed at a high concentration by a cation-π interaction and to a method for manufacturing same, and more particularly to a method for manufacturing a graphene oxide reduced material dispersed in a high concentration by a cation-π interaction comprising: a first step of synthesizing graphite oxide flakes in a powder state from graphite flakes in a powder state; a second step of forming a graphene oxide dispersion solution by dispersing the graphite oxide flakes of the first step into a solvent; a third step of preparing a cation reaction graphene oxide dispersion solution through the interaction of a cation and a π-structure in an sp² region by positioning the cation at the center of an arrangement of carbon atoms connected by sp² bonding in two dimensions in the dispersion solution formed in the second step; and a fourth step of preparing a cation reaction graphene oxide reduced material by reducing the cation reaction graphene oxide dispersion solution of the third step.

8 Claims, 6 Drawing Sheets

(51) Int. Cl.
    *C01B 32/194*    (2017.01)
    *C08K 3/04*    (2006.01)
    *B01J 20/20*    (2006.01)
    *B82Y 30/00*    (2011.01)
    *B82Y 40/00*    (2011.01)
    *C01B 32/182*    (2017.01)

(52) U.S. Cl.
    CPC .......... *C01B 32/182* (2017.08); *C01B 32/194* (2017.08); *C08K 3/042* (2017.05)

(56) References Cited

U.S. PATENT DOCUMENTS

2010/0303706 A1* 12/2010 Wallace ................ B82Y 30/00
    423/445 B

2013/0197256 A1* 8/2013 Wu ........................ B82Y 40/00
    558/56
2014/0370262 A1* 12/2014 Kim .................... C01B 31/0438
    428/219

OTHER PUBLICATIONS

Xiaobin Fan et al., Deoxygenation of Exfoliated Graphite Oxide under Alkaline Conditions: A Green Route to Graphene Preparation, Adv. Mater. 2008, 20, 4490-4493.*

Worsley et al., "Mechanically robust 3D graphene macroassembly with high surface area," Chem. Commun., 2012, 48, 8428-8430.*

Zhou et al., Hydrothermal Dehydration for the "Green" Reduction of Exfoliated Graphene Oxide to Graphene and Demonstration of Tunable Optical Limiting Properties, Chemistry of Materials, 2009, 21, 2950-2956. (Year: 2009).*

* cited by examiner

GRAPHENE OXIDE REDUCED MATERIAL DISPERSED AT HIGH CONCENTRATION BY CATION-Π INTERACTION AND METHOD FOR MANUFACTURING SAME

FIELD OF THE INVENTION

The present invention relates to high-crystallinity reduced graphene oxide, the dispersibility of which is improved by cation-π interaction, and a method of manufacturing the same. More particularly, the present invention relates to reduced graphene oxide dispersed at a high concentration by cation-π interaction, wherein a cation is located at the center of an arrangement of carbon atoms connected by $sp^2$ bonding in two dimensions, thus improving the dispersibility of the reduced graphene oxide through the interaction of the cation and a π-structure in a $sp^2$ region attributable to the physical adsorption thereof, and to a method of manufacturing the same.

BACKGROUND ART

Graphene is a semi-metallic material having an atomic layer in which carbon atoms are hexagonally arranged and connected by $sp^2$ bonding in two dimensions. Recently, a single-layered graphene sheet was stripped from graphite, and the characteristics thereof were evaluated. It was discovered from the evaluation results that the electron mobility of the single-layered graphene sheet was 50,000 $cm^2/V \cdot s$ or more, and that an electron moves at light velocity as if it does not have mass. Further, graphene is characterized in that it has structural and chemical stability and high thermal conductivity. Moreover, it is easy to form a one-dimensional or two-dimensional nanopattern on graphene because it is composed of only carbon which is a light element.

Most of all, graphene, which is a cheap material, has high price competitiveness compared to conventional nanomaterials. Thanks to such electrical, structural, chemical and economical characteristics, it is predicted that graphene will be used in silicon-based semiconductor technologies and will be used in manufacturing electrodes for electric and electronic devices and energy devices. Particularly, thanks to excellent mechanical properties, it is expected that graphene can be practically used in the field of flexible electronic devices.

In spite of excellent properties of graphene, a method of synthesizing high-quality graphene in large amounts and a method of dispersing graphene at high concentration have not yet been developed, and thus research into practically applicable technologies has been very limited.

For example, a graphene film, which is obtained by chemically and mechanically processing graphite crystals using a conventional wet processing method such as Hummers method (W. Hummers and one person, J. Am. Chem. Soc., 80, 1339, 1958), Brodie method (B. C. Brodie, Ann. Chim. Phys., 59, 466-472, 1860) or Staudenmaier method (L. Staudenmaier, Ber. Dtsch. Chem. Ges., 31, 1481-1499, 1898), can be commercially applied, and can be directly used in the field of electronic printing, such as spray coating, dip coating, spin coating, screen printing, inkjet printing, pad printing, knife coating, kiss coating or gravure coating. However, it is difficult to prepare a paste using a high-quality and high-concentration graphene dispersed solution.

The difficulty in preparing a paste is attributable to an aggregation phenomenon occurring in a solvent due to the fact that hydrophilic graphene is converted into hydrophobic graphene during a process of reducing a hydrophilic graphene oxide dispersed solution. Particularly, in the case of graphene oxide having low defectiveness and high purity, the aggregation phenomenon in a dispersion solvent becomes more serious after the conversion of graphene oxide into reduced graphene oxide.

Generally, a method of preparing graphene includes the steps of: forming graphite oxide and dispersing the graphite oxide in an aqueous solution; and reducing graphene oxide. Here, the graphene oxide is formed by a stripping process using an ultrasonicator.

However, since various defects are formed during acid treatment and ultrasonication, and oxygen-containing functional groups exist on the surface of graphene, graphene oxide has semi-conductive properties. In order to solve this problem, reduced graphene oxide is prepared by chemical and thermal reduction. In this case, the property of the reduced graphene oxide is changed from hydrophilicity to hydrophobicity, and a deposit is formed due to the aggregation thereof in a solvent to inhibit the formation of a high-concentration dispersion solution.

Recently, in order to apply a printing process for flexible electric/electronic devices, research into high-concentration and high-crystallinity reduced graphene oxide has actively been conducted. Particularly, professor Rod Rouoff's study group of Texas Austin University in the U.S.A. is doing research into the formation of a graphene-dispersed solution using a wet process.

As such, a polymer-based surfactant is used for the purpose of the stable dispersion of reduced graphene oxide (Stankovich et al., J. Mater. Chem. 2006, 16, 155). However, the usage of the polymer-based surfactant may lead to the deterioration of physical and chemical characteristics of nanomaterials. Further, when an alkali solvent is used, the interaction of a cation and an oxygen function group of graphene oxide occurs, and thus reduced graphene oxide can be stably dispersed in a solvent by Coulomb's repulsion between cations (Park et al., Nano Lett. 2009, 9, 1593.). However, in the case of low-defectiveness/high-purity graphene oxide, a hexagonal $sp^2$ region is relatively widely exposed, and thus the interaction thereof with an oxygen function group is weak. Therefore, a new dispersion concept is required.

DISCLOSURE OF THE INVENTION

Technical Problem

Accordingly, the present invention has been devised to solve the above-mentioned problems, and an object of the present invention is to provide reduced graphene oxide dispersed at a high concentration by cation-π interaction, wherein a cation is located at the center of an arrangement of carbon atoms connected by $sp^2$ bonding in two dimensions, thus improving the dispersibility of the reduced graphene oxide through the interaction of the cation and a π-structure in a $sp^2$ region, and provides a method of manufacturing the same.

Technical Solution

In order to accomplish the above object, an aspect of the present invention provides a method of manufacturing reduced graphene oxide dispersed at a high concentration by cation-π interaction, including the steps of: 1) synthesizing powdered graphite oxide flakes from powdered graphite flakes; 2) dispersing the graphite oxide flakes synthesized in step 1) into a solvent to form a graphene oxide dispersed solution; 3) placing a cation at a center of an arrangement of carbon atoms connected by sp² bonding in a two dimension in the graphene oxide dispersed solution formed in step 2) to prepare a cation-reactive graphene oxide dispersed solution through the interaction of the cation and a π-structure in an sp² region; and 4) reducing the cation-reactive graphene oxide dispersed solution prepared in step 3) to prepare cation-reactive reduced graphene oxide.

In step 1), the graphite oxide flakes may be formed by acid-treating powdered graphite flakes and then washing the acid-treated graphite flakes with an aqueous solution to remove impurities therefrom.

The acid treatment of the powdered graphite flakes may be performed using graphite powder and fuming nitric acid or sulfuric acid.

The washing of the acid-treated graphite flakes may be performed using distilled water.

The washed graphite oxide solution may be formed into graphite oxide powder by drying and grinding.

In step 2), the solvent used in dispersing the powdered graphite oxide flakes synthesized in step 1) may be at least one of an aqueous sodium hydroxide (NaOH) solution, an aqueous potassium hydroxide (KOH), an aqueous ammonium hydroxide (NH₄OH) solution, an aqueous lithium hydroxide (LiOH) solution, and an aqueous calcium hydroxide (Ca(OH)₂) solution.

The aqueous solution may have a pH of 8 or more.

The dispersing of the graphite oxide flakes may be performed using at least one of a sonicator, a homogenizer and a high-pressure homogenizer.

The dispersing of the graphite oxide flakes may be performed for 10 min~5 hr.

In step 3), the reaction time for the interaction of the cation and the π-structure may be maintained at 10° C.~200° C. for 1 min~10 hr after the dispersing of the graphite oxide flakes in step 2).

Step 3) may be performed using the graphene oxide dispersed solution having a concentration of 1 mg/L~50 g/L in step 2).

In step 3), the interaction of the cation and the π-structure may be activated at a temperature of 10° C.~200° C. after the dispersing of the graphite oxide flakes in step 2).

The solvent volatilization may be one of rotary evaporation, centrifugal separation and stirring The cation-reactive graphene oxide dispersed solution formed in step 3 may be formed into graphene oxide powder through freeze drying.

In step 4), the reduction of the cation-reactive graphene oxide dispersed solution in step 4) may be conducted by a wet process.

The reduction of the cation-reactive graphene oxide dispersed solution in step 4) may be conducted using a reductant, and the reductant may be at least one of sodium hydroxide (NaOH), potassium hydroxide (KOH), ammonium hydroxide (NH₄OH), sodium tetrahydroborate (NaBH₄), hydrazine (N₂H₄), hydroionic acid, ascorbic acid, and vitamin C.

The reduction of the cation-π interacting graphene oxide dispersed solution may be conducted by the addition of a reducing solvent, and the reducing solvent may be at least one selected from the group consisting of acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, and dimethylsulfoxide.

Another aspect of the present invention provides a reduced graphene oxide dispersed at a high concentration by cation-π interaction, wherein, in a graphene oxide dispersed solution, a cation is located at the center of an arrangement of carbon atoms connected by hexagonal sp² bonding in two dimensions, and interaction of the cation and a π-structure in a sp² region is caused.

The graphene oxide dispersed solution may be formed by dispersing powdered graphite oxide flakes into an alkaline solvent.

The alkaline solvent may be at least one of an aqueous sodium hydroxide (NaOH) solution, an aqueous potassium hydroxide (KOH), an aqueous ammonium hydroxide (NH₄OH) solution, an aqueous lithium hydroxide (LiOH) solution, and an aqueous calcium hydroxide (Ca(OH)₂) solution.

The cation may be formed by the ionization of the alkaline solvent.

The powdered graphite oxide flakes may be formed by acid-treating powdered graphite flakes and then washing the acid-treated graphite flakes with an aqueous solution to remove impurities therefrom.

The acid treatment of the powdered graphite flakes may be performed using fuming nitric acid or sulfuric acid.

The washing of the acid-treated graphite flakes may be performed using distilled water, and the washed graphite oxide solution may be formed into graphite oxide powder by drying and grinding.

The aqueous solution may have a pH of 8 or more.

The reduction of the cation-π interacting graphene oxide dispersed solution may be conducted by a wet process. The reduction thereof may be conducted using a reductant, and the reductant may be at least one of sodium hydroxide (NaOH), potassium hydroxide (KOH), ammonium hydroxide (NH₄OH), sodium tetrahydroborate (NaBH₄), hydrazine (N₂H₄), hydroionic acid, ascorbic acid, and vitamin C.

The reduction of the cation-π interacting graphene oxide dispersed solution may be conducted by the addition of a reducing solvent, and the reducing solvent may be at least one selected from the group consisting of acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, and dimethylsulfoxide. Accordingly, there is an advantage in that a cation is located at the center of an arrangement of carbon atoms connected by sp² bonding in two dimensions, and interaction of the cation and a π-structure in a sp² region is caused, thus improving the dispersibility of the reduced graphene oxide solution.

According to the present invention, in the graphene oxide dispersed solution, a cation is located at the center of an arrangement of carbon atoms connected by hexagonal sp² bonding in two dimensions, and interaction of the cation and a π-structure in a sp² region takes place, thus improving the dispersibility of the reduced graphene oxide solution.

BEST MODE OF THE INVENTION

Figure 1:
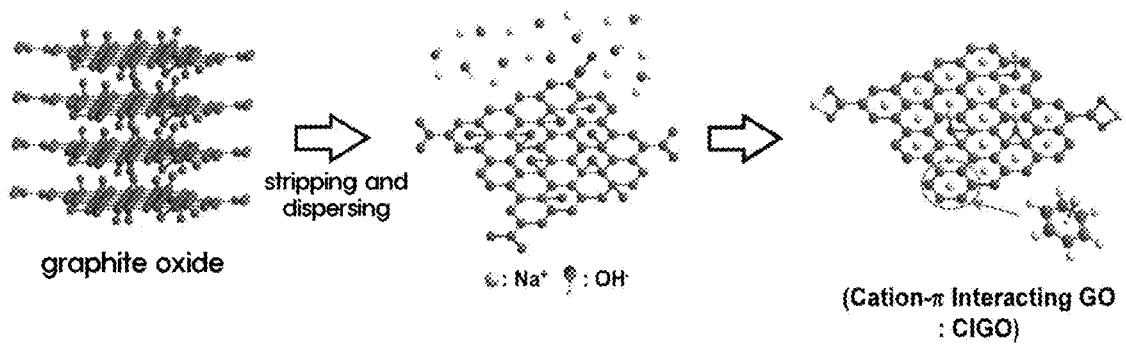
FIG. 1 is a schematic view showing the procedure and method of cation-π interaction of low-defectiveness/high-purity graphene oxide and the result of formation of reduced graphene oxide according to an embodiment of the present invention.

Hereinafter, preferred embodiments of the present invention will be described in detail with reference to the attached drawings.

A method of manufacturing reduced graphene oxide dispersed at a high concentration by cation-π interaction according to an embodiment of the present invention, includes the steps of: 1) synthesizing powdered graphite oxide flakes from powdered graphite flakes; 2) dispersing the graphite oxide flakes synthesized in step 1) into a solvent to form a graphene oxide dispersed solution; 3) placing a cation at a center of an arrangement of carbon atoms connected by $sp^2$ bonding in two dimensions in the graphene oxide dispersed solution formed in step 2) to prepare a cation-reactive graphene oxide dispersed solution through the interaction of the cation and a π-structure in an $sp^2$ region; and 4) reducing the cation-reactive graphene oxide dispersed solution prepared in step 3) to prepare cation-reactive reduced graphene oxide.

First, step 1) will be described.

In step 1), the graphite oxide flakes are obtained by acid-treating powdered graphite flakes, repeatedly washing the acid-treated graphite flakes with an aqueous solution and then removing impurities using a centrifugal separator.

The acid treatment of the powdered graphite flakes is preformed using any one of Staudenmaier method (L. Staudenmaier, Ber. Dtsch. Chem. Ges., 31, 1481-1499, 1898), Hummers method (W. Hummers and one person, J. Am. Chem. Soc., 80, 1339, 1958) and Brodie method (B. C. Brodie, Ann. Chim. Phys., 59, 466-472, 1860), which are well known in the related field.

Here, the preparation of the graphite oxide flakes is performed using graphite powder and fuming nitric acid or sulfuric acid. The graphite oxide flakes are prepared by adding sodium chlorate ($NaClO_4$) or potassium permanganate ($KMnO_4$) and then reacting these reactants at room temperature for 48 hours.

Then, the acid-treated graphite flakes are neutralized with distilled water, and then filtered and washed repeatedly.

The washed graphite oxide solution is formed into graphite oxide powder by drying and grinding.

After step 1), step 2) proceeds. In step 2), low-defectiveness/high-purity graphene oxide is prepared by dispersing the graphite oxide flakes into a solvent and stripping the graphite oxide flakes.

In step 2), as the solvent for dispersing the synthesized powdered graphite oxide flakes, an alkaline solvent, such as an aqueous sodium hydroxide (NaOH) solution, an aqueous potassium hydroxide (KOH), an aqueous ammonium hydroxide ($NH_4OH$) solution, an aqueous lithium hydroxide (LiOH) solution or an aqueous calcium hydroxide ($Ca(OH)_2$) solution is used, and, if necessary, dimethylformamide or N-methyl-2-pyrrolidone may be added. The aqueous solution can disperse the powdered graphite oxide flakes at a pH of 8 or more, and, preferably, may have a pH of 10 or more.

Further, in the formation of graphene oxide, the dispersing and stripping of the graphite oxide flakes may be performed using at least one of a sonicator, a homogenizer and a high-pressure homogenizer.

In this case, the time required in the dispersing/stripping of the graphite oxide flakes may be 10 min~5 hr. When the dispersing and stripping time is less than 10 min, there is a problem in that the dispersing/stripping thereof is not easily performed. Further, when the dispersing/stripping time is more than 5 hr, there is a problem in that high-quality graphene oxide cannot be obtained because the formation of defects increases.

After step 2), step 3) proceeds. In step 3), a cation-reactive graphene oxide dispersed solution is prepared through the cation-π interaction of the low-defectiveness/high-purity graphene oxide.

In step 3), the cation-reactive graphene oxide dispersed solution can be obtained by reacting the graphene oxide dispersed solution for 1 min~10 hr while an external physical force, such as ultrasonic grinding, is not applied.

Here, the cation-reactive graphene oxide dispersed solution can be obtained by maintaining the reaction time of about 10 min at room temperature while the concentration of the graphene oxide dispersed solution is 1 mg/L~50 g/L. In this case, when the concentration of the graphene oxide dispersed solution is less than 1 mg/L, there is a problem in that it is difficult to form high-concentration graphene oxide, and, when the concentration thereof is more than 50 g/L, there is a problem in that the aggregation phenomenon of graphene oxide occurs.

In this reaction, as shown in FIG. 1, the reaction of a cation, such as a sodium ion, potassium ion, ammonium ion or calcium ion, with a π-structure in a hexagonal $sp^2$ region is activated by the addition of an alkaline solvent. In this case, an oxygen function group is removed from graphene oxide by the weak reduction reaction of the alkaline solvent, and the reaction time for interaction of graphene oxide with the cation is maintained. It is shown in FIG. 1 that the added alkaline solvent contains sodium hydroxide (NaOH). Therefore, the cation is a sodium ion.

Further, in order to prepare a high-concentration graphene oxide dispersed solution and a high-viscosity paste, the cation-π interaction can be activated using a solvent volatilization method (for example, rotary evaporation, centrifugal separation or stirring).

In order to increase the cation-adsorptive hexagonal $sp^2$ region of graphene through weak reduction, temperature and time is adjusted using an oil bath, thereby removing a local oxygen function group. Further, when water is vaporized by a solvent volatilization method, the cation-π interaction is activated, thereby preparing a high-concentration graphene oxide dispersed solution. In this case, the concentration of the graphene oxide dispersed solution may be 1 mg/L~50 g/L. At the time of preparing a high-viscosity paste, the viscosity range may be set to 5000~200000 cP. Here, when the viscosity range is less than 5000 cP, there is a problem in that uniform graphene coating is difficult, and, when the viscosity range is more than 200000 cP, there is a problem in that the aggregation phenomenon of graphene is caused due to the formation of high-viscosity paste.

The cation-reactive graphene oxide dispersed solution prepared in step 3 may be formed into graphene oxide powder through freeze drying for 10 hr or more. Therethrough, the concentration of graphene oxide can be accurately calculated.

After step 3), step 4) of preparing a cation-reactive reduced graphene oxide proceeds. In step 4), the cation-reactive reduced graphene oxide is obtained by reducing the cation-reactive graphene oxide dispersed solution prepared in step 3) using a wet process.

The reduction of the cation-reactive graphene oxide dispersed solution may be conducted using a reductant. The reductant may be used without limitations, and may be at least one of sodium hydroxide (NaOH), potassium hydroxide (KOH), ammonium hydroxide ($NH_4OH$), sodium tetrahydroborate ($NaBH_4$), hydrazine ($N_2H_4$), hydroionic acid, ascorbic acid, and vitamin C.

As the solvent used in the low-defectiveness/high-purity reduced graphene oxide dispersed solution, a general polar or non-polar solvent may be used without limitation. For example, the solvent may be at least one selected from the group consisting of acetone, methyl ethyl ketone, methyl alcohol, ethyl alcohol, isopropyl alcohol, butyl alcohol, ethylene glycol, polyethylene glycol, tetrahydrofuran, dimethylformamide, di methylacetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, and dimethylsulfoxide.

As described above, thanks to the formation of reduced graphene oxide through the cation-π interaction, a high-concentration reduced graphene dispersed solution can be formed.

Hereinafter, the present invention will be described in more detail with reference to the following Examples.

EXAMPLE 1

First, 10 g of pure graphite (purity: 99.9995%, −200 mesh, manufactured by Alfar Aesar Corporation), 350 ml of fuming nitric acid and 74 g of sodium chloride oxide (two times by 37 g) were sequentially mixed to obtain a mixture. The mixture was stirred for 48 hours, and then neutralized, washed, filtered, cleaned and then dried to prepare graphene oxide. It was ascertained by an XRD meter whether the interval between the prepared graphene oxide particles was increased to some degree. In this case, the interlayer diffraction angle of graphite oxide, measured by an X-ray diffraction method, was 10°~15°.

The graphene oxide prepared in this way was introduced into distilled water (pH 10) containing NaOH at a concentration of 300 mg/L, and then ultrasonically treated for 1 hour to make a uniform graphene oxide dispersed solution.

Figure 2:
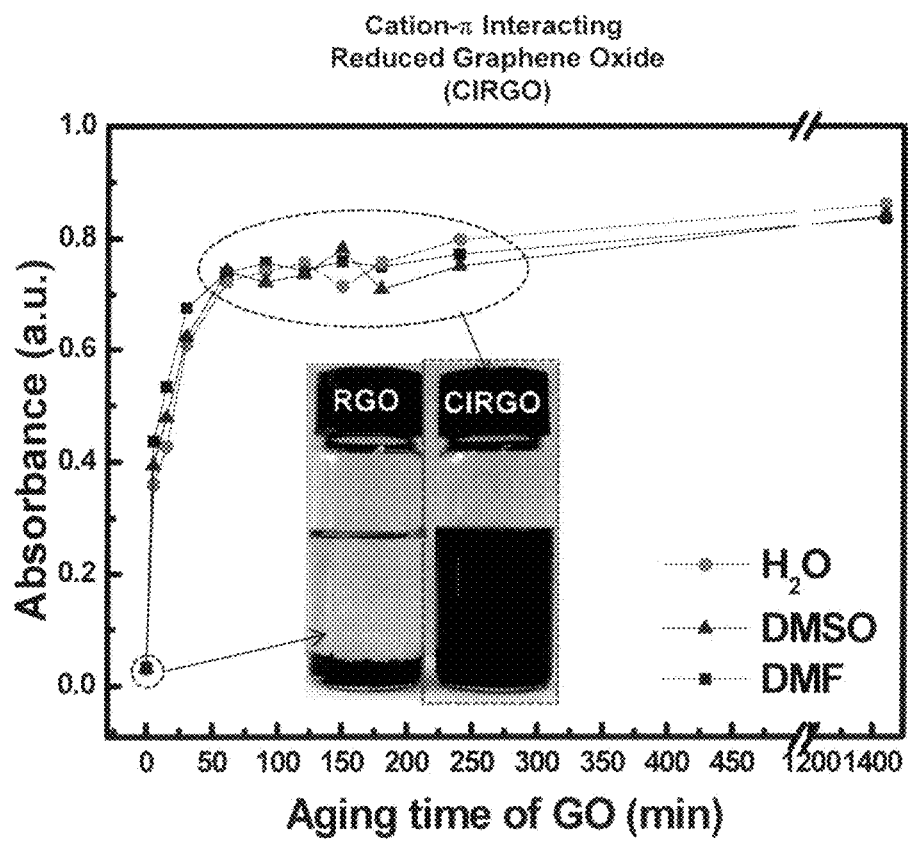
FIG. 2 is a graph showing the results of comparing the dispersity of cation-π interacting reduced graphene oxide with that of reduced graphene oxide depending on the change in absorbance of reduced graphene oxide attributable to the adjustment of reaction time for cation-π interaction of graphene oxide according to an embodiment of the present invention.

Thereafter, the reaction time of the graphene oxide dispersed solution was maintained for a predetermined amount of time at room temperature in order to apply cation-π interaction. When the reaction time thereof is maintained for 1 hour or more, the physical properties thereof are stably exhibited. In Example 1, the graphene oxide dispersed solution, obtained by maintaining the reaction time for 1 hour or more is used. Hereinafter, as shown in FIG. 2, the graphene oxide dispersed solutions, obtained by changing the reaction time of cation-π interaction under the same condition as in Example 1, will be described in detail.

The graphite oxide dispersed solution obtained in this way may be formed into graphene oxide powder through freeze drying for 10 hr or more. Therethrough, the concentration of graphene oxide can be accurately calculated.

Here, dimethylformamide was used as a solvent for dispersing graphene oxide powder. 170 ml of hydrazine ($N_2H_4$) was added to the graphene oxide dispersed solution having a concentration of 300 mg/L, and then this solution was stirred at 100° C. for 16 hours at a stirring speed of 400 rpm to reduce graphene oxide, thereby obtaining a graphene dispersed solution. In this case, reduced graphene oxide dispersed at a high concentration may also be prepared.

Thereafter, a process of filtering the graphene dispersed solution was conducted using a polytetrafluoroethylene membrane filter having a pore size of 0.2 μm. That is, the graphene-dispersed solution having a concentration of 0.2 g/L was added with dimethylformamide, filtered and then washed with distilled water five times to obtain a high-quality reduced graphene oxide film. The characteristics of the reduced graphene oxide film were measured. In this case, the electrical conductivity of this film was 97,500 S/m.

EXAMPLE 2

In Example 2, reduced graphene oxide was prepared under the same conditions as in Example 1, except that dimethylsulfoxide was used instead of dimethylformamide as a solvent for dispersing powdered graphene oxide. Further, the reduced graphene oxide was filtered and washed in the same manner as in Example 1 to form a reduced graphene oxide film. The electrical conductivity of the reduced graphene oxide film was measured. The result in Example 2 was similar to that in Example 1.

EXAMPLE 3

In Example 3, reduced graphene oxide was prepared under the same conditions as in Example 1, except that distilled water was used instead of dimethylformamide as a solvent for dispersing powdered graphene oxide. Further, the reduced graphene oxide was filtered and washed in the same manner as in Example 1 to form a reduced graphene oxide film. The electrical conductivity of the reduced graphene oxide film was measured. The result in Example 3 was similar to that in Example 1.

EXAMPLE 4

In Example 4, first, 10 g of pure graphite (purity: 99.9995%, −200 mesh, manufactured by Alfar Aesar Corporation), 350 ml of fuming nitric acid and 74 g of sodium chloride oxide (two times by 37 g) were sequentially mixed to obtain a mixture. The mixture was stirred for 48 hours, and then neutralized, washed, filtered, cleaned and then dried to prepare graphene oxide. It was ascertained by an XRD meter whether the interval between the prepared graphene oxide particles was increased to some degree. In this case, the interlayer diffraction angle of graphite oxide, measured by an X-ray diffraction method, was 10°~15°.

The graphene oxide prepared in this way was introduced into distilled water (pH 10) containing KOH at a concentration of 2 g/L, and then ultrasonically treated for 1 hour to make a uniform graphene oxide dispersed solution.

The graphite oxide dispersed solution obtained in this way may be formed into graphene oxide powder or sponge-shaped graphene oxide flake through freeze drying for 10 hr or more. Therethrough, the concentration of graphene oxide can be accurately calculated.

Thereafter, in order to prepare high-concentration/high-viscosity graphene oxide paste by activating cation-π interaction, the freeze-dried graphene oxide was dispersed in an aqueous alkali (KOH) solution (pH: 10). Further, a solvent volatilization process was carried out in an oil bath at 100° C. for 2 hours through weak reduction and rotary evaporation. The concentration of the graphene oxide paste prepared in this way was 20 g/L.

170 ml of hydrazine ($N_2H_4$) was added to the high-concentration graphene oxide dispersed solution having a concentration of 300 mg/L, and then this solution was stirred at 100° C. for 16 hours at a stirring speed of 400 rpm to a reduce graphene oxide using dimethylformamide as a solvent.

COMPARATIVE EXAMPLE

In the comparative Example, reduced graphene oxide was formed in the same manner as in Example 1, except that cation-π interaction was not applied to a graphene oxide dispersed solution. That is, the reduced graphene oxide was formed by directly freeze-drying a graphene oxide dispersed solution without applying cation-π interaction thereto, and then reducing the freeze-dried product. Here, other conditions are the same as those of Example 1.

The property experiments of the graphene oxides of the Examples were carried out. FIG. 2 is a graph showing the results of comparing the dispersity of cation-π interacting reduced graphene oxide (hereinafter, referred to as "CIRGO"), prepared by each of the methods of Examples 1, 2 and 3, with that of reduced graphene oxide depending on the change in absorbance of reduced graphene oxide (hereinafter, referred to as "RGO"), to which cation-π interaction was not applied, attributable to the adjustment of reaction time for cation-π interaction of graphene oxide.

As shown in FIG. 2, in the case of CIRGO, it can be seen that its absorbance is maintained constant when a reaction time is 1 hour or more, and that the dispersity of its dispersed solution is also maintained good.

In contrast, in the case of RGO, it can be seen that its absorbance is not excellent, and that the deposit of RGO was formed due to an aggregation phenomenon because a cation-π interaction does not exist.

Figure 3:
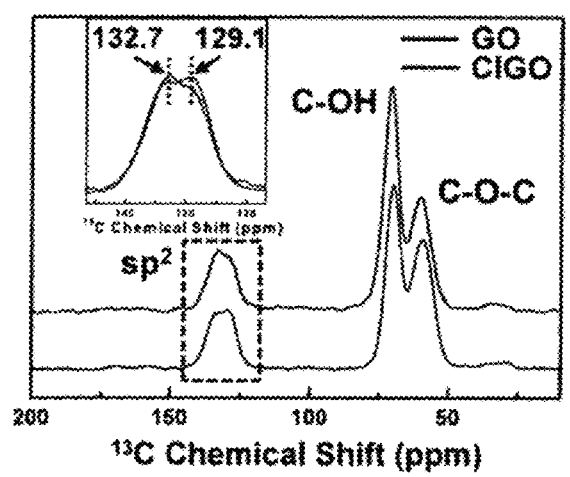
FIG. 3 is a graph showing the result of formation of cation-π interaction, physical evidence and comparative example of graphene oxide depending on $^{13}C$ NMR measurement according to an embodiment of the present invention.

FIG. 3 is a graph showing the results of formation of cation-π interaction, physical evidence and comparative example of graphene oxide depending on $^{13}C$ NMR measurement.

Further, FIG. 3 shows the results of formation of cation-π interaction and physical evidence of cation-π interacting graphene oxide (hereinafter, referred to as "CIGO"), prepared in Example 1, and graphene oxide (hereinafter, referred to as "GO") of Comparative Example, to which cation-π interaction was not applied, depending on the $^{13}C$ NMR measurement.

As shown in FIG. 1, in the case of general graphene oxide (GO), a peak related to $sp^2$ carbon appears at a $^{13}C$ chemical shift of 129.1 ppm. However, in the case of cation-π interacting graphene oxide (CIGO), this peak appears at a $^{13}C$ chemical shift of 132.7 ppm, which is evidence of a phenomenon caused by a ring current effect attributable to the adsorption of a cation ($Na^+$), which means that cation-π interaction exists in Examples 1 to 4.

Figure 4:
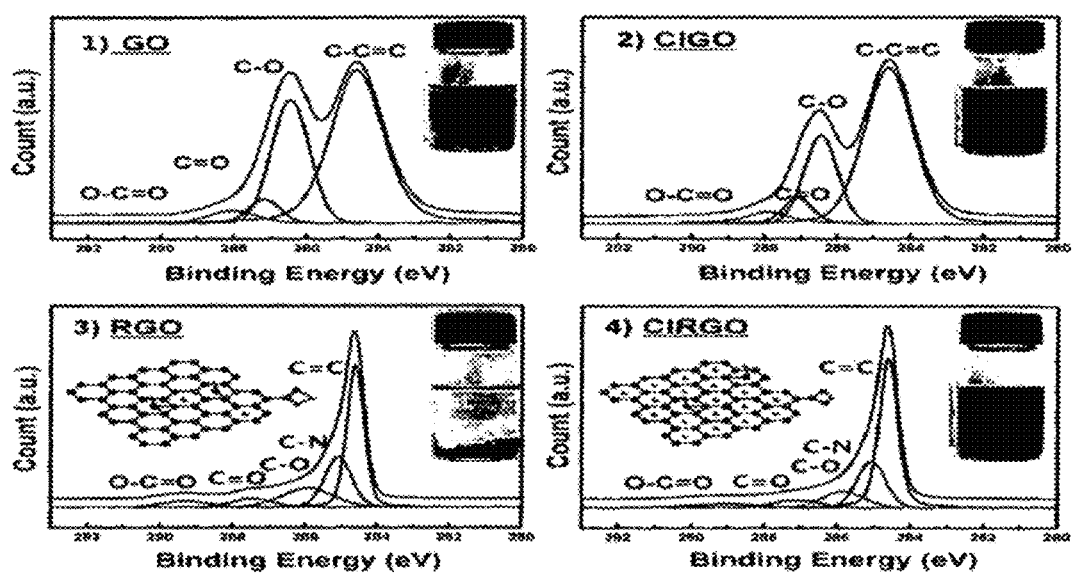
FIG. 4 presents graphs showing the changes in oxidation groups of graphene oxide and reduced graphene oxide and the comparative example thereof depending on the procedure of cation-π interaction using XPS measurement according to an embodiment of the present invention.

FIG. 4 presents graphs showing the changes in oxidation groups of graphene oxide and reduced graphene oxide depending on the procedure of cation-π interaction using XPS measurement according to Examples 1 to 4 and the Comparative Example.

In FIG. 4, 1) shows the oxidation groups of non-interacting GO, which is graphene oxide formed according to the Comparative Example. In this case, the graphene oxide dispersed solution is light yellow.

In contrast, 2) shows cation-π interacting graphene oxide (CIGO), which is graphene oxide formed according to Example 1. The amount of the oxidation group of this CIGO is decreased by a weak reduction due to an alkaline solvent after maintaining the reaction, and the dispersed solution thereof is brown. It can be seen that graphite oxide particles are uniformly dispersed in the graphite oxide dispersed solutions of 1) and 2).

However, 3) shows cation-π non-interacting reduced graphene oxide (RGO), which is reduced graphene oxide formed according to the Comparative Example. It can be seen that the dispersity of this RGO deteriorates due to the occurrence of an aggregation phenomenon.

In contrast, 4) shows cation-π interacting reduced graphene oxide (CIRGO), which is cation-π interacting reduced graphene oxide formed according to Example 1. It can be seen that the dispersity of this CIRGO is good.

The reason for this is that the aggregation phenomenon of reduced graphene oxide is not caused by Coulomb's repulsion between cations. This CIRGO can be dispersed in various solvents regardless of polarity and nonpolarity.

Further, from FIG. 4, it can be ascertained that, when reduced graphene oxide is formed by hydrazine, a tendency to remove an oxidation group from cation-π interacting reduced graphene oxide by reduction is not changed, and this cation-π interaction exerts an influence on the dispersion of reduced graphene oxide particles.

Figure 5:
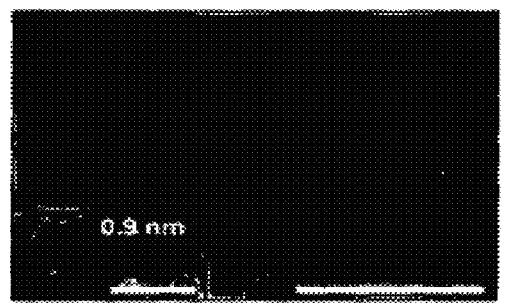
FIG. 5 is a photograph showing the SEM and AFM images of CIRGO according to an embodiment of the present invention.

FIG. 5 is a photograph showing the SEM and AFM images of the CIRGO of the present invention, wherein the SEM and AFM images of the CIRGO of Example 1 were measured. From FIG. 5, it can be seen that single-layer graphene is formed on a plane.

Figure 6:
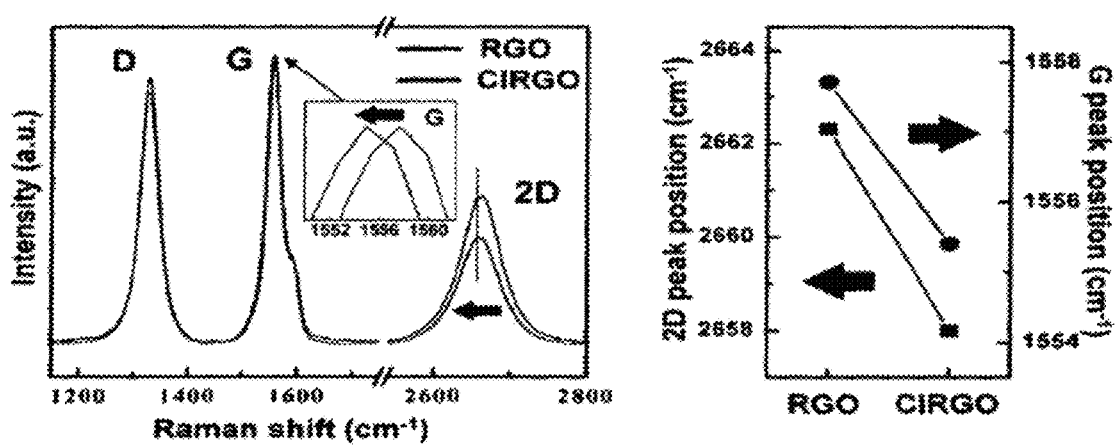
FIG. 6 presents graphs showing the results of cation-π interaction using the resonance Raman spectrum measurement according to an embodiment of the present invention, which includes the spectral change of reduced graphene oxide depending on a cation doping effect, the shape of low-defectiveness/high-purity cation-reactive reduced graphene oxide and the Raman spectrum result thereof.

FIG. 6 presents graphs showing the results of cation-π interaction using the resonance Raman spectrum measurement according to an embodiment of the present invention, which includes the spectral change of reduced graphene oxide depending on a cation doping effect, the shape of low-defectiveness/high-purity cation-reactive reduced graphene oxide and the Raman spectrum result thereof. Here, CIRGO was prepared in Example 1, and RGO was prepared in Comparative Example.

In FIG. 6, at the time of measuring the Raman spectrum of graphene, a G peak appears at a Raman shift of about 1594 cm$^{-1}$, thus ascertaining the formation of graphene. Further, the degree of crystallization of graphene can be ascertained by the peak ratio of D band/G band.

In this case, this peak ratio of D/G is lower than that obtained after the reduction treatment of hydrazine. Therefore, it can be ascertained that low-defectivenss/high-purity reduced graphene oxide was formed. Further, whether or not single-layer graphene is formed can be ascertained based on the fact that the position of a 2D peak around a Raman shift of 2645 cm$^{-1}$ is symmetric with the line form of spectrum. From this, it can be seen that single-layer graphene of reduced graphene oxide was formed. In particular, it can be seen that, in the case of CIRGO, ion scattering results from the cation-π interaction caused by the adsorption of cations on the sp$^2$ region of CIRGO depending on the peak ratio of 2D/G, and that the cation-π interaction occurs, as indicated via the Raman spectrum.

Figure 7:
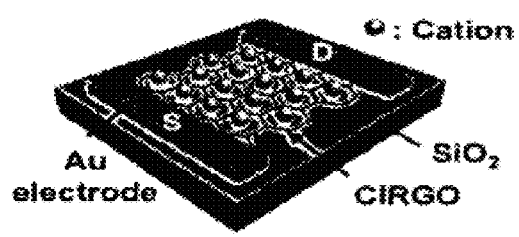
FIG. 7 is a schematic view showing a field-effect transistor of cation-π interacting reduced graphene oxide according to the present invention.

FIG. 7 is a schematic view showing a field-effect transistor of cation-π interacting reduced graphene oxide according to the present invention. This field-effect transistor is configured such that the CIRGO of Example 1 is applied on the upper surface of a SiO$_2$ substrate.

Figure 8:
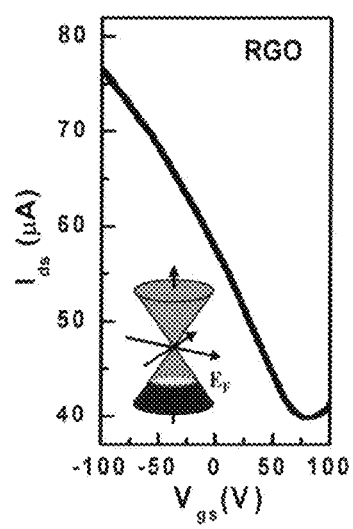
FIG. 8 presents graphs showing the physical evidence of the cation doping effect and charge mobility of reduced graphene oxide and cation-π interacting reduced graphene oxide depending on the measurement of I-V characteristics of the field-effect transistor of FIG. 7.
Figure 8:
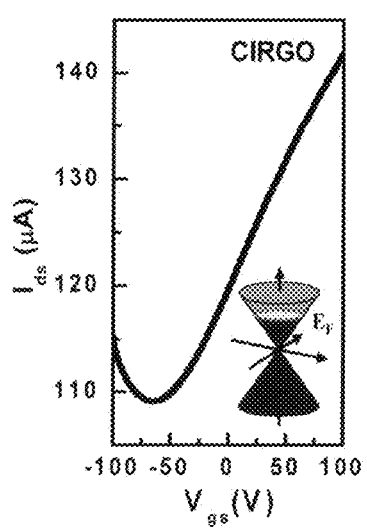
Figure 8:
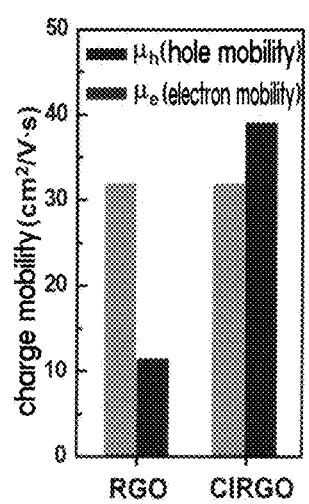

FIG. 8 presents graphs showing the physical evidence of the cation doping effect and charge mobility of reduced graphene oxide and cation-π interacting reduced graphene oxide depending on the measurement of I-V characteristics of the field-effect transistor of FIG. 7.

In FIG. 8, a transistor coated with the CIRGO of Example 1 and a transistor coated with the RGO of Comparative Example were fabricated, and then the electrical characteristics thereof were evaluated.

In FIG. 8, conventional reduced graphene oxide (RGO) exhibits typical P-type semiconductor characteristics, and exhibits a positive gate voltage (Vgs) as a critical voltage. These characteristics are caused by an oxygen function group that was not removed.

However, when cations are adsorbed on the reduced graphene oxide (RGO), it exhibits a negative critical voltage, and exhibits N-type semiconductor characteristics. These characteristics are caused because electrons are transferred from cations to graphene, and electron mobility increases. Therefore, the cation-u interaction in graphene may be caused by a doping effect attributable to the adsorption of cations.

Figure 9:
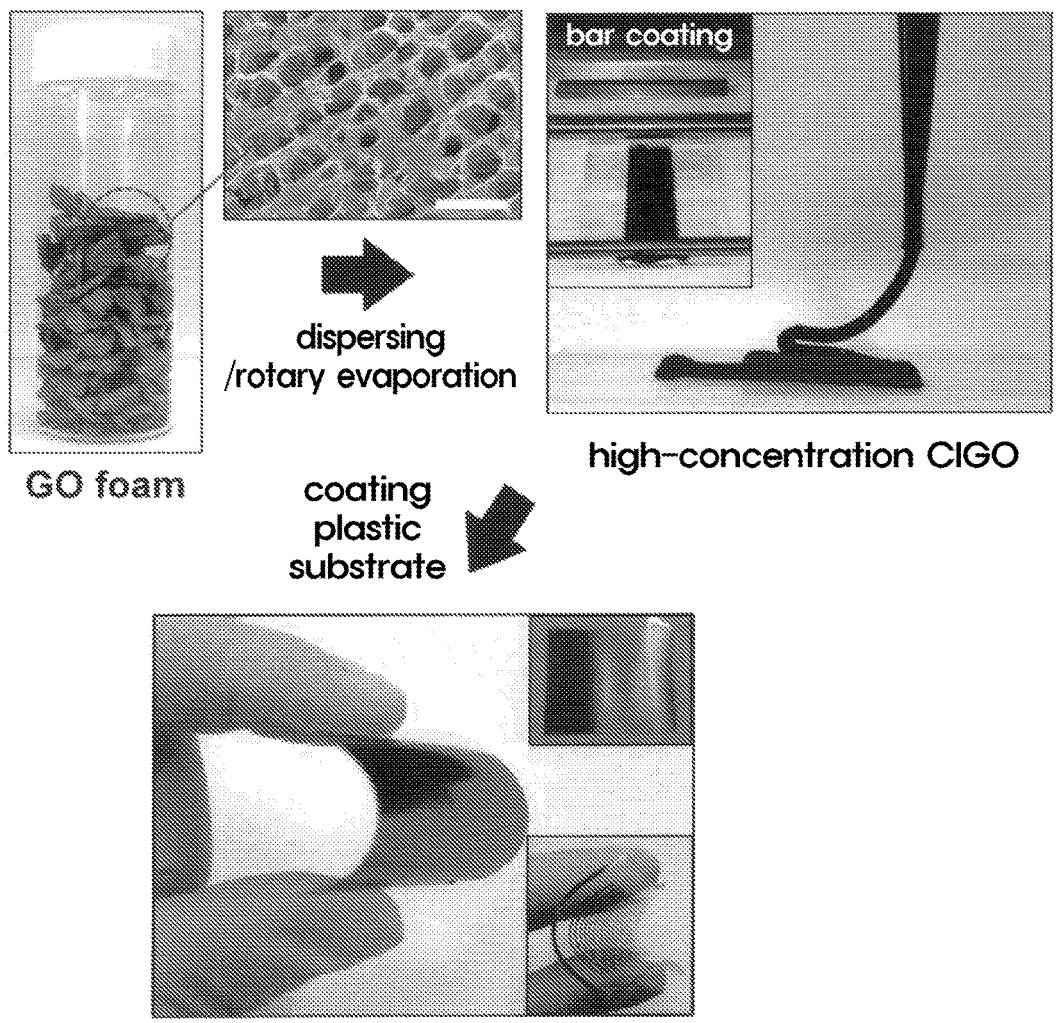
FIG. 9 is a schematic view showing a method of mass-producing cation-π interacting reduced graphene oxide, a process of activating a high-concentration graphene oxide solution using scattering or rotary evaporation, a method of preparing a paste and a process of forming a conductive film using the prepared paste by bar coating according to an embodiment of the present invention.

FIG. 9 shows a method of mass-producing cation-π interacting reduced graphene oxide, a process of activating a high-concentration graphene oxide solution using scattering or rotary evaporation, a method of preparing paste and a process of forming a conductive film using the prepared paste by bar coating.

In FIG. 9, CIGO, which is cation-π interacting graphene oxide of Example 4, is used. The preparation method thereof is explained as follows. First, sponge-shaped graphene oxide (GO) flakes are dispersed in an aqueous alkaline solution (KOH) having pH of 10. Then, rotary evaporation for activating cation-π interaction is used in order to prepare a high-concentration graphene oxide dispersed solution and a high-purity graphene oxide paste, and a local oxidation group is removed by treating the resulting product at 100° C. for 2 hours using an oil bath in order to enlarge the hexagonal graphene sp2 region capable of adsorbing cations. Thereafter, water is volatilized using a rotary evaporator, and thus the cation-π interaction is activated, thereby preparing the high-concentration graphene oxide dispersed solution. The high-concentration graphene oxide dispersed solution prepared in this way is formed into the high-purity graphene oxide paste. This graphene oxide paste may be applied onto various plastic substrates (PET, PDMS). The application of the graphene oxide paste may be conducted using bar coating.

Figure 10:
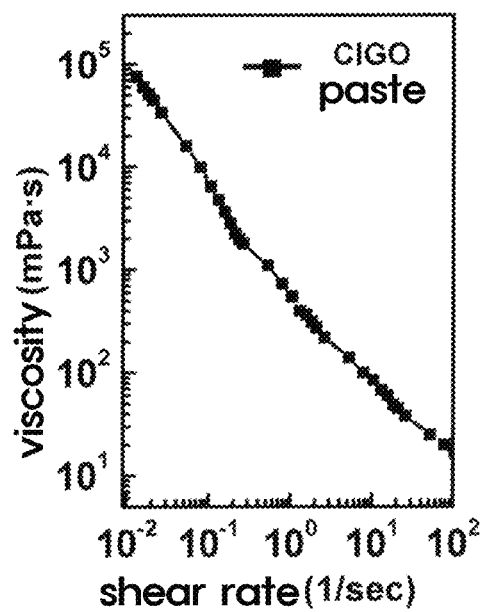
FIG. 10 is a graph showing the results of measurement of viscosity of high-concentration graphene oxide prepared by the process of FIG. 9.

FIG. 10 is a graph showing the results of measurement of viscosity of high-concentration graphene oxide prepared by the process of FIG. 9. Here, the viscosity of GIGO is similar to that of conventional silver paste, and a high-concentration CIGO paste having a viscosity of 10$^5$ mPas at a shear rate of 10$^{-2}$/sec is prepared.

As describe above, in the graphene oxide dispersed solution, a cation is located at the center of an arrangement of carbon atoms connected by hexagonal sp$^2$ bonding in two dimensions, and the interaction of the cation and a π-structure in a sp$^2$ region is caused, thus improving the dispersibility of the reduced graphene oxide solution and preparing high-concentration graphene oxide paste.

Here, in order to cause the cation-π interaction in the graphene oxide dispersed solution, an alkaline solvent is used as a dispersion solvent, and the metal ions included in the dispersion solvent are located at the center of an arrangement of carbon atoms connected by sp$^2$ bonding, thus applying the cation-π interaction thereto.

However, at least one selected from the group consisting of acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, and dimethylsulfoxide, each of which is not an alkaline solvent, may be used as the dispersion solvent; and at least one cation-converted metal selected from the group consisting of lithium, sodium, potassium, silver, mercury, beryllium, magnesium, calcium, iron, lead, barium, copper, ammonium, boron, aluminum, gallium, bismuth, arsenic, cadmium, cobalt, antimony, manganese, zinc, strontium, nickel may be used; thereby applying the cation-π interaction. It will be obvious that this configuration belongs to the scope of the present invention.

INDUSTRIAL APPLICABILITY

The present invention relates to high-crystallinity reduced graphene oxide, the dispersibility of which is improved by cation-π interaction, and a method of manufacturing the same. More particularly, the present invention relates to reduced graphene oxide dispersed at a high concentration by cation-π interaction, wherein a cation is located at the center of an arrangement of carbon atoms connected by sp$^2$ bonding in two dimensions, thus improving the dispersibility of the reduced graphene oxide through the interaction of the cation and a π-structure in a sp$^2$ region attributable to the physical adsorption thereof, and to a method of manufacturing the same. Therefore, the invention is applicable in industrial fields.

What is claimed is:

1. A method of manufacturing a cation-reactive reduced graphene oxide, comprising the steps of:
   1) synthesizing powdered graphite oxide flakes from powdered graphite flakes;
   2) dispersing the graphite oxide flakes into an alkaline solution and stripping the graphite oxide flakes to form graphene oxide dispersed solution, said alkaline solution being selected from a group consisting of an aqueous sodium hydroxide (NaOH), an aqueous potassium hydroxide (KOH), an aqueous ammonium hydroxide ($NH_4OH$), an aqueous lithium hydroxide (LiOH), and an aqueous calcium hydroxide ($Ca(OH)_2$);
   3) performing reaction of the graphene oxide dispersed solution at 10° C.~200° C. for 1 min~10 hr to remove a local oxygen functional group from an $sp^2$ region of the graphene oxide and cause interaction of a cation and a 7-structure in an $sp^2$ region of the graphene oxide to form a cation-reactive graphene oxide dispersed solution;
   4) reducing said cation-reactive graphene oxide to prepare cation-reactive reduced graphene oxide by using reductant, said reductant being at least one of sodium hydroxide (NaOH), potassium hydroxide (KOH), ammonium hydroxide ($NH_4OH$), sodium tetrahydroborate ($NaBH_4$), hydrazine ($N_2H_4$), hydroionic acid, ascorbic acid, and vitamin C.

2. The method of claim 1, wherein, in step 1), the graphite oxide flakes are formed by acid-treating powdered graphite flakes and then washing the acid-treated graphite flakes with an aqueous solution to remove impurities therefrom.

3. The method of claim 2, wherein the acid treatment of the powdered graphite flakes is performed using graphite powder and fuming nitric acid or sulfuric acid.

4. The method of claim 2, wherein the washing of the acid-treated graphite flakes is performed using distilled water, and dried to form graphite oxide powder.

5. The method of claim 1, wherein the alkaline solution has a pH of 8 or more.

6. The method of claim 5, wherein the interaction of the cation and the π-structure in step 3) of the method is performed using the graphene oxide dispersed solution having a concentration of 1 mg/L~50 g/L.

7. The method of claim 6, wherein any one solvent volatilization selected from among rotary evaporation, centrifugal separation and stirring is performed during step 3) of the method.

8. The method of claim 1, further comprising a step for freeze drying the cation-reactive graphene oxide dispersed solution formed in step 3) into cation-reactive graphene oxide powder.

* * * * *